(No Model.)

W. COMRA.
NUT LOCK.

No. 589,545. Patented Sept. 7, 1897.

Witnesses
E. C. Wurdeman
J. J. Williamson

Inventor
William Comra
By Geo. H. Holgate
Attorney

UNITED STATES PATENT OFFICE.

WILLIAM COMRA, OF PHILADELPHIA, PENNSYLVANIA.

NUT-LOCK.

SPECIFICATION forming part of Letters Patent No. 589,545, dated September 7, 1897.

Application filed January 16, 1897. Serial No. 619,405. (No model.)

*To all whom it may concern:*

Be it known that I, WILLIAM COMRA, a citizen of the United States, residing at Philadelphia, in the county of Philadelphia and State of Pennsylvania, have invented a certain new and useful Improvement in Nut-Locks, of which the following is a specification.

My invention relates to a new and useful improvement in nut-locks, and has for its object to provide a simple, cheap, and effective device of this description whereby a nut may be locked in place upon a bolt against either a forward or retrograde movement and without any reference or dependence upon the surface against which the nut may bear.

With this end in view this invention consists in the details of construction and combination of elements hereinafter set forth, and then specifically designated by the claims.

In order that those skilled in the art to which this invention appertains may understand how to make and use the same, its construction and operation will now be described in detail, referring to the accompanying drawings, forming a part of this specification, in which—

Figure 1:
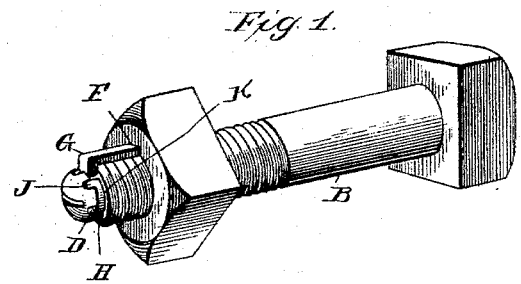
Figure 2:
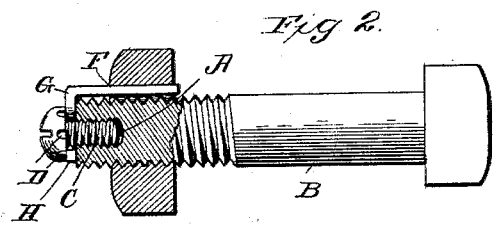
Figure 3:
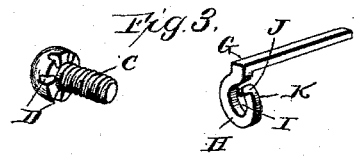

Figure 1 is a perspective of a bolt having my improvement applied thereto, showing the nut in place thereon; Fig. 2, a side elevation of a bolt, the outer end thereof being broken away and sectioned, the nut also being in section, so as to illustrate the coöperation of the several parts; and Fig. 3, a detailed perspective of the lock screw and key.

In carrying out my invention as here embodied I form a threaded hole A in the end of the bolt B, and the threads of this hole are left-handed and adapted to receive the likewise-threaded lock C. In the under surface of the head of the screw is formed a series of notches D, which serve to lock this screw in place, as will be hereinafter set forth. The nut E, which is of usual construction and may be of any desired design, has formed therein a keyway, as indicated at F, for the reception of the key G, which latter when in use lies upon the top of the threads of the bolt. This key has formed therewith the washer H, which is so bent as to provide an opening I for the passage of the screw C, and also a detent J, which receives a certain amount of spring action from said washer, as will be readily understood by reference to Fig. 3.

From this description the operation of my improvement will be obviously as follows: The nut is first run upon the bolt until reaching the desired point, which is usually where it bears against the surface of the object held by the bolt, when the key is passed within the keyway in such manner as to cause the washer to lie upon the end of the bolt, and finally the screw is run within the hole A until the under surface of its head comes in contact with the detent J, which when the screw is forced tightly against the washer this detent will spring within one of the notches D, thereby locking said screw to the washer, so as to prevent either from turning independent of each other, which, as will be readily understood, will hold the key against rotary movement in the direction that it would be necessary to turn the nut to back it off the bolt, since the screw is provided with left-handed threads, while the nut and bolt are provided with right-handed threads. Thus so long as the screw will remain locked to the washer the nut cannot have a retrograde movement, since any tendency in this direction will only more firmly bind the head of the screw against the washer on account of the reverse direction of its threads.

When it is desired to back the nut from off the bolt, it is only necessary to run the screw backward, during which time the detent will be caused to spring out of the notches by the force applied to the screw.

It is to be noted that the nut may be locked upon the bolt at any point so long as the key remains in the keyway, and therefore it is only necessary that this key be long enough to remain in the keyway when the nut is run to the inner ends of the threads upon the bolt. One of the advantages of my improvement is that the nut may be locked at any portion of its revolution, as well as at any point in its travel upon the bolt, since wherever the detent stops the head of the screw will come in contact therewith and one of the notches therein will engage said detent and lock the washer and key against a retrograde movement.

Another advantage of my improvement is its exceeding simplicity and effectiveness when in use, as well as the small cost attendant upon its construction.

In order that the detent may have a free spring action, the washer is slightly cut away at the point indicated by K, and this will prevent any binding or cramping action when the screw-head is forced against the washer.

Having thus fully described my invention, what I claim as new and useful is—

1. A nut-lock, consisting of a key adapted to fit within a keyway formed in the nut and having a washer upon which is formed a detent, and a screw adapted to run within a left-handed threaded hole and having notches formed upon its under side for engagement with said detent, as specified.

2. In combination, a key adapted to fit within a keyway formed upon a nut, a washer formed with said key, a detent carried by the washer, a left-handed threaded screw adapted to run within a suitably-threaded hole in the bolt, and a head formed upon said screw in which are notches for engagement with the detent, as specified.

3. The herein-described combination of a bolt, having a left-handed threaded hole in its under side, a screw adapted to run within said hole, said screw having a head formed thereon in which are notches, a nut having a keyway formed therein, a key adapted to fit said way, a washer formed with the key, and a detent carried by the washer for engagement with the notches of the head, substantially as and for the purpose set forth.

In testimony whereof I have hereunto affixed my signature in the presence of two subscribing witnesses.

WILLIAM COMRA.

Witnesses:
S. S. WILLIAMSON,
F. MATTNER.